United States Patent [19]

Nakano

[11] Patent Number: 4,755,660
[45] Date of Patent: Jul. 5, 1988

[54] IC CARD SYSTEM
[75] Inventor: Harumi Nakano, Tokyo, Japan
[73] Assignee: Casio Computer Co., Ltd., Tokyo, Japan
[21] Appl. No.: 921,337
[22] Filed: Oct. 17, 1986
[30] Foreign Application Priority Data
Oct. 22, 1985 [JP] Japan .................. 60-236029
[51] Int. Cl.⁴ .......................... G06K 5/00
[52] U.S. Cl. .................... 235/380; 235/492
[58] Field of Search .............. 235/380, 492
[56] References Cited
U.S. PATENT DOCUMENTS
4,001,550 1/1977 Schatz .................. 235/492 X 4,367,402 1/1983 Giraud et al. .......... 235/380
4,575,621 3/1986 Dreifus ................ 235/380

Primary Examiner—David L. Trafton
Attorney, Agent, or Firm—Frishauf, Holtz, Goodman & Woodward

[57] ABSTRACT

An IC card system includes a memory, having a plurality of areas into which history data of transactions made with the use of an IC card is written, a detecting unit for calculating the number of available history data areas of plurality of data storage areas and display means provided in the IC terminal or IC card to clearly display that number as a remaining available data storage number.

7 Claims, 7 Drawing Sheets

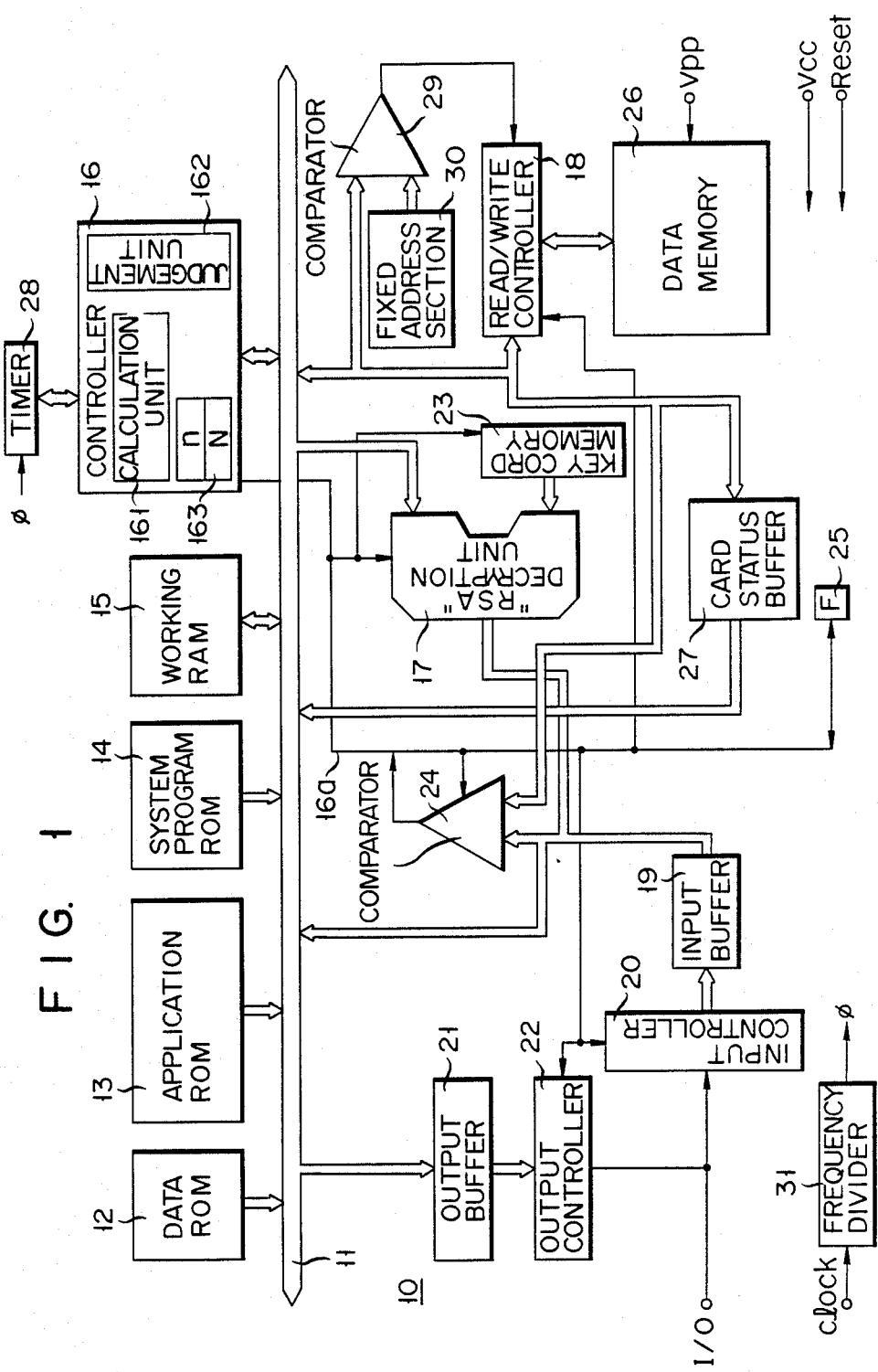
F I G. 1

IC CARD SYSTEM

BACKGROUND OF THE INVENTION

This invention relates to an IC card system which is capable of clearly indicating a remaining portion of a history data storage area of a memory in an IC card for transactions, etc, within its incorporated integrated circuit.

The present time has recently been called a "cashless" age, and commodities can be cashlessly purchased with the use of a card issued by a credit card company. etc.

Of the conventional cards available, use is made of plastic cards, embossed cards, magnetic stripe cards, etc. However, these cards may be easily forged, presenting an "unauthorized use" problem.

In order to solve such a problem, an information card or so-called IC card may be conceived which includes an IC circuit with a memory section for storing, for example, a code number. An IC card system based on a combination of an IC card and card terminal has now been developed in this field of art.

In the conventional IC card system, when, for example, a purchase is to be made on credit with the use of an IC card, the IC card is inserted into the card terminal. Then, the code number, for example, is keyed in and confirmed by the system. Then a credit processing is implemented by keying in credit information. At the same time, that information is stored as history data in the history data storage area of a data memory in the IC card.

For the history data memory of the IC card, use is made of an erasable programmable read only memory (EP-ROM) or electrically erasable programmable read only memory (EEP-ROM).

The conventional system, however, has no means for clearly indicating a remaining portion of the history data storage area in the data memory of the IC card. In the EP-ROM type in particular, however, there is a possibility that the IC card will suddenly be found unsuitable at some time due to the data storage area being completely filled. In the EEP-ROM type, on the other hand, when the data storage area of the data memory is filled, the oldest data stored is deleted by the socalled "overlay" and thus replaced with new data.

In the former case, the user will be unduly inconvenienced when he finds the IC card unsable after a purchase of commodities at a store. In the latter case, the history data may be unintentionally erased forever, with the result that it cannot be read out later.

SUMMARY OF THE INVENTION

It is accordingly an object of this invention to provide an IC card system which eliminates the aforementioned drawbacks, can continuously indicate a remaining portion of a history data storage area in a data memory of an IC card and never causes any feeling of undue concern by the user during use, thus assuring the ease and confidence with which the IC card is used.

According to this invention, there is provided an IC card system comprising:

a memory unit having a plurality of areas for storing history data of transactions performed with the use of an IC card;

a read/write unit for controllably writing the history data into one of the plurality of areas in the memory unit and reading out data from any predetermined area, each time a transaction is performed;

a detecting unit for detecting a number of used or remaining available areas of the plurality of areas in the memory unit; and a display unit for displaying a value corresponding to the number of areas detected by the detecting unit.

BRIEF DESCRIPTION OF THE DRAWINGS

The object and features of this invention can be understood in conjunction with the following embodiment by reference to the accompanying drawings in which:

FIG. 1 is a circuit arrangement of an IC card for use in an IC card system according to a first embodiment of this invention;

DETAILED DESCRIPTION OF THE PREFERRED EMBODIMENTS

Figure 2A:
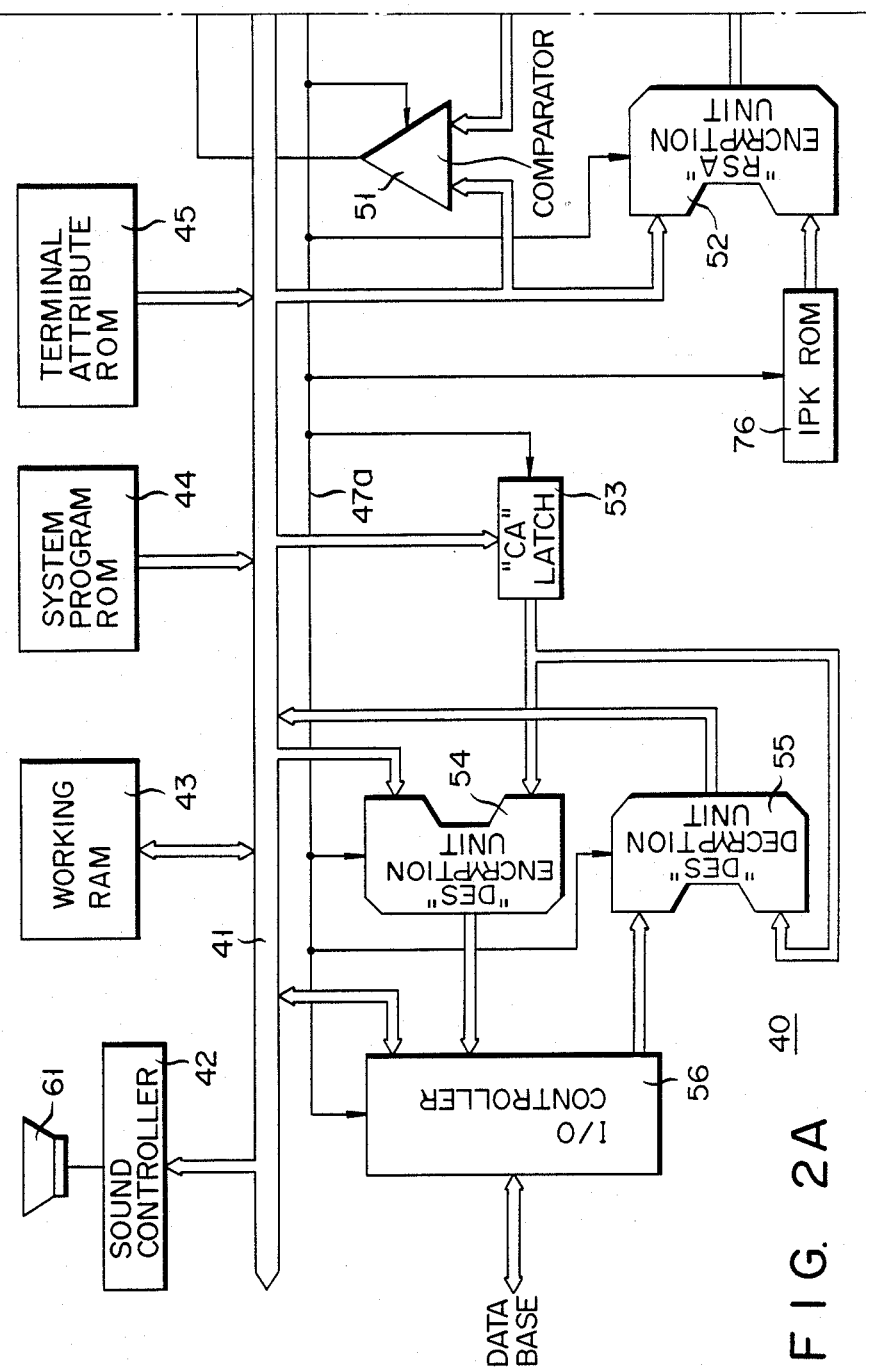
FIGS. 2A and 2B are a circuit arrangement of a card terminal for use in the first embodiment.

An IC card system according to one embodiment of this invention will be explained below with reference to the accompanying drawings.

FIG. 1 is a circuit arrangement showing IC card 10. System bus 11 is connected to data read-only memory (ROM) 12, application ROM 13, system program ROM 14, working random access memory (RAM) 15, system controller 16, "RSA" decryption unit 17, read/write controller 18, input controller 20 connected through input buffer 19, and output controller 22 connected through output buffer 21. A data input/output terminal I/O is connected to input controller 20 and output controller 22.

Figure 2B:
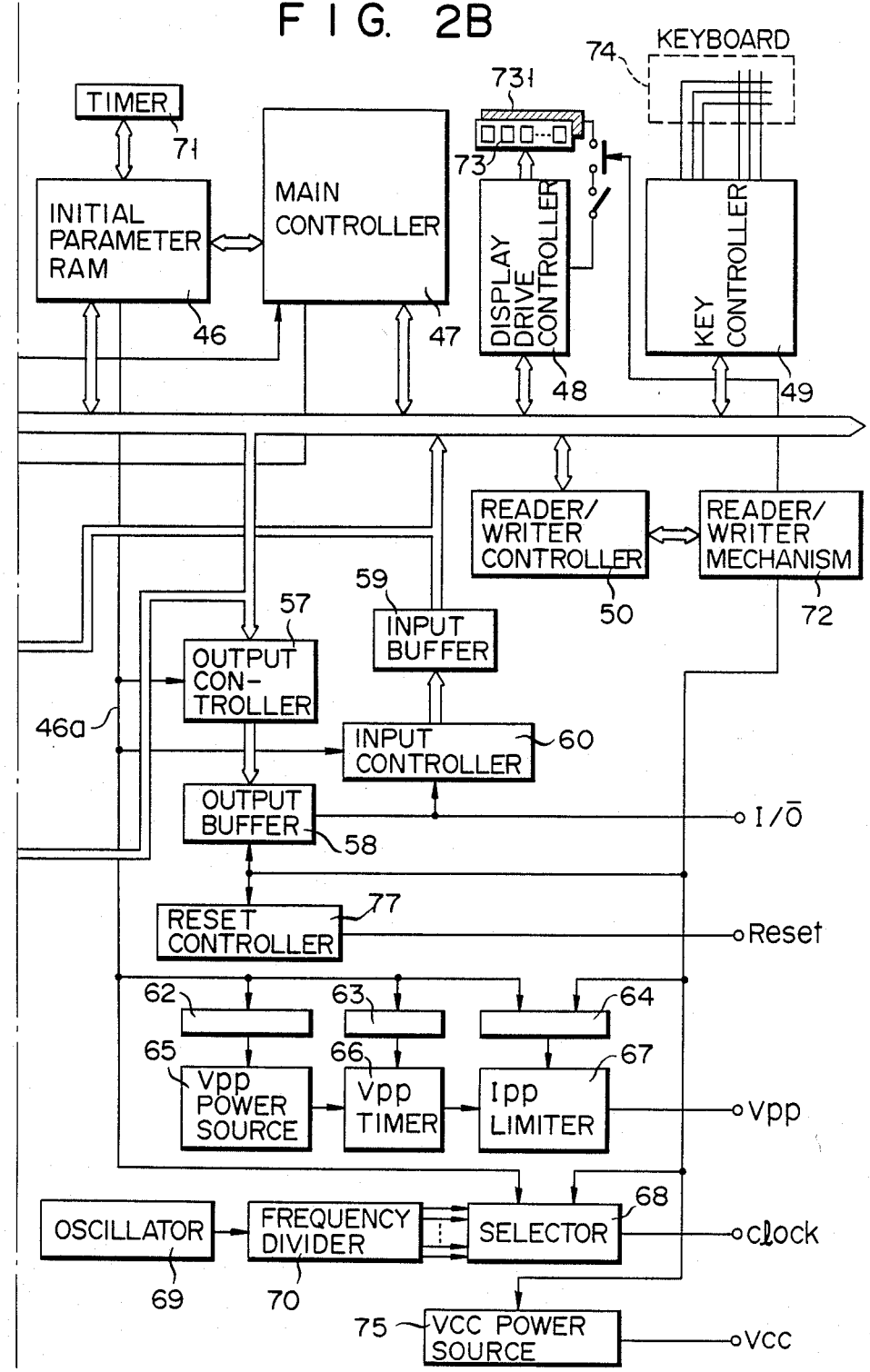

Data ROM 12 stores all operation conditions for IC card 10 per se, such as a data-write application voltage, its current allowable value and maximum application voltage, maximum data transmission quantity and maximum response wait time. When an internal initialization of the card per se is complete, the conditional data is transmitted as an answer-to-reset data to terminal 40 in accordance with a predetermined format. Application ROM 13 stores card type data "APN" (Application Name) indicating the type of IC card 10. When an attribute exchange is made with respect to terminal 40 as shown in FIGS. 2A and 2B after an initial parameter has been set, based on the answer-to-reset data, the data "APN" is sent in a predetermined format. System program ROM 14 has, together with various programs, a code signal ("ACK" or "NAC") for indicating whether a signal supplied from the terminal 40 side is correct or not. System controller 16 delivers a data "receive" signal supplied through input buffer 19, as well as an operation instruction, etc. The system controller 16 includes calculation unit 161, judgement unit 162, and register 163 for storing an ahead address n of history data storage area in data memory 26 as set forth below, as well as the number of remaining available times, N, the history data can be written into the history data storage area. Decryption unit 17 performs a code decryption based on an "RSA" algorithm and is adapted to allow input data which is supplied from the terminal 40 through input buffer 19 to be decrypted by a key code (Issuer's Private Key) for code decryption, which is stored in key code memory 23, and then to deliver an output to comparator 24. A comparison output of comparator 24 is supplied to system control line 16a for system controller 16. Flag 25 is connected to system control line 16a and operated based on a result of comparison by comparator 24. Read/write controller 18 is responsive to an instruction from system controller 16 to perform a data read/write operation for data memory 26. The read/write controller 18 delivers memory data to system bus 11, card status buffer 27 or comparator 24. Data memory 26 is comprised of, for example, an EEP-ROM which stores codes "CA", "IPIN", "PAN", "CHN", "EPD", "PRK", and "RTN" and status data "ST", noting that "CA"(Card Authenticator) is, for example, a 64-bit code for use in the encryption and descryption of a message. "IPIN"(Initialization Personal Identification Number) is, for example, a 6-bit code which is an identification number to be replaced by "PIN" (Personal Identification Number). "PAN" (Primary Account Number) denotes an account number and "CHN" (Card Holder's Name) denotes the name of a card holder. "EPD" (Expiration Date) shows an effective period and "PRK" (Private Key Code) a code for decryption. "RTN" represents the number of times data is repetitively entered. "ST" shows a current status of card 10 and is sent to the terminal 40 in the same data format as that for the card type code "APN" which is stored in application ROM 13.

A history data storage area is provided in data memory 26 and stores history data corresponding to the status of the use of IC card 10.

Timer 28 is connected to system controller 16. In a normal data exchange processing, timer 28 counts a predetermined time when a data "write" voltage supply starting instruction is sent to terminal 40. During the count operation of timer 28, if never supplied with an enquiry signal "ENQ" or the other data from the terminal 40, system controller 16 inhibits data from being input to, or output from, IC card 10.

Address comparator 29 connected to a bus line for connecting read/write controller 18 to system bus 11. Address comparator 29 compares an unused specific number set to fixed address section 30, for example, at the completion of a test run, subsequent to the manufacture of the card, with a number designated through system bus 11. The address comparator supplies a comparison output to read/write controller 18 and, only when the comparison output is an address coincidence signal, clears all memory data in data memory 26, thereby inhibiting confidential data from being improperly read out of IC card 10.

IC card 10 receives a reset signal "Reset" and system clock "Clock" when attached to terminal 40 and is connected to power supply terminals Vcc and Vpp. Here, the power supply terminal Vcc is for system drive and power supply terminal Vpp is for data entry into data memory 26. This power supply voltage is set in the terminal 40 on the basis of the answer-to-reset data stored in data ROM 12. A system operation signal from the aforementioned system clock "Clock" is supplied to the associated circuits.

FIGS. 2A and 2B are a circuit arrangement showing card terminal 40 to which is inserted IC card 10.

In FIGS. 2A and 2B, system bus 41 is connected to sound controller 42, working RAM 43, system program ROM 44, terminal attribute ROM 45, initial parameter RAM 46, main controller 47, display drive controller 48, key controller 49, reader/writer controller 50, comparator 51, encryption unit 52 for performing an encryption operation on the basis of an "RSA" algorithm, latch circuit 53 for allowing a latch of "CA", encryption unit 54 of a DES (Data Encription Standard) type, decryption unit 55 of a similar DES type, input/output (I/O) controller 56, output buffer 58 connected through output controller 57, and input controller 60 connected through input buffer 59.

Speaker 61 is connected to sound controller 42 to produce an alarm sound as required. Working RAM 43 stores, for example, an account number "PAN" (Primary Account Number), name "CHN" (Card Holder's Name) of the card holder, and effective period "EPD" (Expiration Data), as well as various data processed in the system. System program ROM 44 contains not only various system programs, but also an "ENQ" (enquiry) code for matching with IC card 10. Terminal attribute ROM 45 stored terminal code "TC", such as a manufacturing code, issuing code and "store" code, varying in accordance with their usage at the respective terminals, as well as a card type code "APN" (Application Name). Here, the terminal code "TC" is sent in a predetermined data format when an attribute exchange is made with respect to IC card 10 after the initial parameter has been based on the answer-to-reset data from IC card 10. Initial parameter RAM 46 collectively stores the answer-to-reset data from IC card 10. Initial parameter RAM 46 is connected, via initial data transmission line, to aforementioned output controller 57, input controller 60, and level latch sections 62, 63 and 64. Latch sections 62, 63 and 64 are connected to Vpp power supply 65, Vpp timer 66 and Ipp limiter 67, respectively. An output line of Vpp power source 65 is connected to Vpp output terminal sequentially through Vpp timer 66, and Ipp limiter 67. Here, the card data maximum "write" voltage of Vpp power source 65, write voltage supply time of Vpp timer 66 and card data maximum allowable "write" current of Ipp limiter 67, for example, are set based on the answer-to-reset data stored in initial parameter RAM 46.

Operation frequency selector 68 for IC card 10 is connected to data transmission line 46a. An oscillation signal from oscillator 69 is supplied through frequency divider 70 to selector 68 and the oscillation signal set to the operation frequency is delivered from the Clock terminal.

Timer 71 is connected to initial parameter RAM 46. Based on the answer-to-reset data collectively stored in initial parameter RAM 46, timer 71 counts a maximum response wait time after an enquiry "ENQ" or the other instruction signal has been sent from the terminal 40, for example, to the IC card 10. Where there is no response signal from the IC card 10 within this wait time, main controller 47 again makes an enquiry, again indicates that other instructions should be sent, or instructs a later-described reader/writer mechanism 72, through reader/writer controller 50, to interrupt a connection with IC card 10. Comparator 51, encryption unit 52, "CA" latch 53 and input/output controller 56 are connected to system control line 47a of main controller 47 so that a control instruction is sent from main controller 47 to these circuit elements in accordance with the operation state of the system.

Display drive controller 48 provides a display control to display section 73 and back light 731, such as an EL display element, at the back of display section 73. Back light 731 is lighted only when IC card 10 is located in reader/writer mechanism 72.

Key controller 49 supplies a key sampling signal to keyboard 74 and detects a key input signal.

Reader/writer controller 50 controls reader/writer mechanism 72 for driving. Here, reader/writer mechanism 72 includes a motor for card delivery and is adapted to, when the IC card is inserted through a card insertion slit, feed the card to a predetermined position so that it is electrically connected to terminal 40, and adapted to, when the IC card has undergone a predetermined processing, return it to the card insertion slit.

To reader/writer mechanism 72 are connected output buffer 58, reset controller 77, Ipp level latch section 64, operation frequency selector 68 and Vcc power supply source 75, whose corresponding terminals I/O, Reset, Vpp, Clock and Vcc are set to a high impedance when no IC card is loaded.

Input controller 60 and output controller 57 allow a data exchange with respect to IC card 10 in accordance with a main controller's instruction which has passed through initial parameter RAM 46. Input controller 60 delivers data coming from IC card 10 to a memory section of, for example, working RAM 43 through input buffer 59 and to comparrtor 51. The comparison output of comparator 51 is fed to main controller 47. Output controller 57 receives data from the memory section of, for example, terminal attribute ROM 45, and encryption data from encryption unit 52, and sends them to IC card 10 through output buffer 58. Encryption unit 52 encrypts "PAN", supplied from working RAM 43 via system bus 41, in accordance with a public key code which is supplied from "IPK"(Issuer's Public Key) ROM 76 comprised of data ROM. IPK ROM 76 is initially stored with a public key code corresponding to decription code "PRK" (Private Key Code) in the data memory of IC card 10, and delivers a storage code when an instruction is given from main controller 47.

Latch 53 supplies a latched "CA" to encryption unit 54 and decryption unit 55. Encryption unit 54 receives predetermined data via system bus 41, encrypts "PAN" etc. in working RAM 43 by an instruction of main controller 47 with "CA" as a key and delivers an output to input/output controller 56. Decryption unit 55 decrypts the encrypted data, which is input to input/output controller 56, on the basis of "CA" and supplies it to system bus 41.

Where a data base, i.e., a host computer is connected in an on-line fashion, input/output controller 56 allows an exchange of such encrypted data.

U.S. Patent Application Ser. No. 884,280, filed July 16, 1986 and assigned to the same assignee as that of this invention discloses, an IC card system as set forth in detail in connection with the setting of an initial condition in relation to an IC card and card terminal, such as an answer-to-resetting and attribute exchanging.

The operation of this embodiment so arranged will be explained below.

First, an explanation will be given below as to the implementation of a data exchange, such as a cash transaction, between card terminal 40 and IC card 10 with IC card 10 loaded into card terminal 40.

In this case, an initialization signal is initially sent to IC card 10, placing the IC card under the operation conditions determined by signals including this signal. That is, in IC card 10, answer-to-reset data which is stored in data ROM 12 is read out under the control of system controller 16, and sent to terminal 40 through system bus 11, output buffer 21 and output controller 22.

When the answer-to-reset data is thus sent to terminal 40, it is written into initial parameter RAM 46 through the I/O terminal, input controller 60, input buffer 59 and system bus 41. In this state, main controller 47 judges whether or not the data written into initial parameter RAM 46 corresponds to a correct terminal. A maximum data transmission quantity controlled by main controller 47, data "write" voltage determined by Vpp power supply 65, continuous data "write" voltage application time determined by Vpp timer 63, data "write" current allowable value determined by Ipp limiter 67 and operation frequency for the IC card as determined by operation selector 68 are set to corresponding values, under the operation conditions for use in IC card 10 only, on the basis of the answer-to-reset data written into aforementioned initial parameter RAM 46, when a correspondence occurs. When, on the other hand, the answer-to-reset data from IC card 10 is judged as not corresponding to the correct terminal, main controller 47 provides a control instruction to reader/writer controller 50, thus interrupting a connection to IC card 10 at reader/writer mechanism 72.

Then main controller 47 receives an "ENQ" code from system program ROM 44 and supplies it to the IC card 10 through system bus 41, output controller 57, and output buffer 58 and I/O terminal. IC card 10 receives the "ENQ" code through input controller 20 and input buffer 19 and, with the "ENQ" code written into working RAM 15, system controller 16 judges whether or not the "ENQ" code can be received in the normal operation. If the "ENQ" code is judged as being a YES, a corresponding code "ACK" is taken from system program ROM 14 and if, on the other hand, the "ENQ" code is judged as being a NO, a corresponding code "NAC" is taken from system program ROM 14. These codes are supplied to terminal 40 through output buffer 21 and output controller 22. The result of the judgement is written into working RAM 43 through the I/O terminal, input controller 60, input buffer 59 and system bus 41. If the IC card is confirmed as being normally operated, that is, the "ACK" signal is involved, main controller 47 takes out a different terminal code "TC" corresponding to the type of the terminal stored in terminal attribute ROM 45 and is latched to output buffer 58. If, on the other hand, the IC card is not in an normally operative state, i.e., the "NAC" signal is involved, then main controller 47 provides a control instruction to reader/writer controller 50, thus interrupting a connection to the IC card at reader/writer mechanism 72.

The terminal code "TC" latched to output buffer 58 is transmitted through the I/O terminal to the IC card 10. In the IC card, system controller 16 takes out a different application name "APN" corresponding to the type of the card stored in application ROM 13, and returns it to terminal 40 after it has been latched to output buffer 21.

In terminal 40, the application name "APN" is fed through the I/O terminal, input controller 60, input buffer 59 and system bus 41 to working RAM 43 where it is stored.

Then, main controller 47 takes out a card "type" code stored in working RAM 43 and compares it with the application name "APN" initially stored in terminal attribute ROM 45 to see whether or not there is a correspondence for their usage.

When a correspondence between the card "type" code and "APN" is judged as occurring with respect to the type of the IC card now loaded, a formal instruction code is taken from system program ROM 44 on the basis of this judgement and sent to IC card 10. When no correspondence is judged as occurring with respect to the type of the IC card, main controller 47 provides a control instruction to reader/writer controller 50, thus interrupting a connection to the IC card at reader/writer mechanism 72. At the same time, a control instruction is supplied to display drive controller 48, indicating that a noncoincidence occurs with respect to the type of the IC card.

When an instruction code is taken out, a comparison is performed between the code number keyed in through, for example, keyboard 74 and the personal identification number "PIN" initially stored in IC card 10 in accordance with the instruction code. When a coincidence occurs as a result of comparison, then a subsequent data exchange operation, such as a subsequent cash transaction, is performed.

By reference to a flow chart shown in FIG. 3, an explanation will be given below of how the writing of history data into the history data storage area and displaying of a remaining available portion of the history data storage area are performed subsequent to the execution of a data exchange processing.

Figure 3:
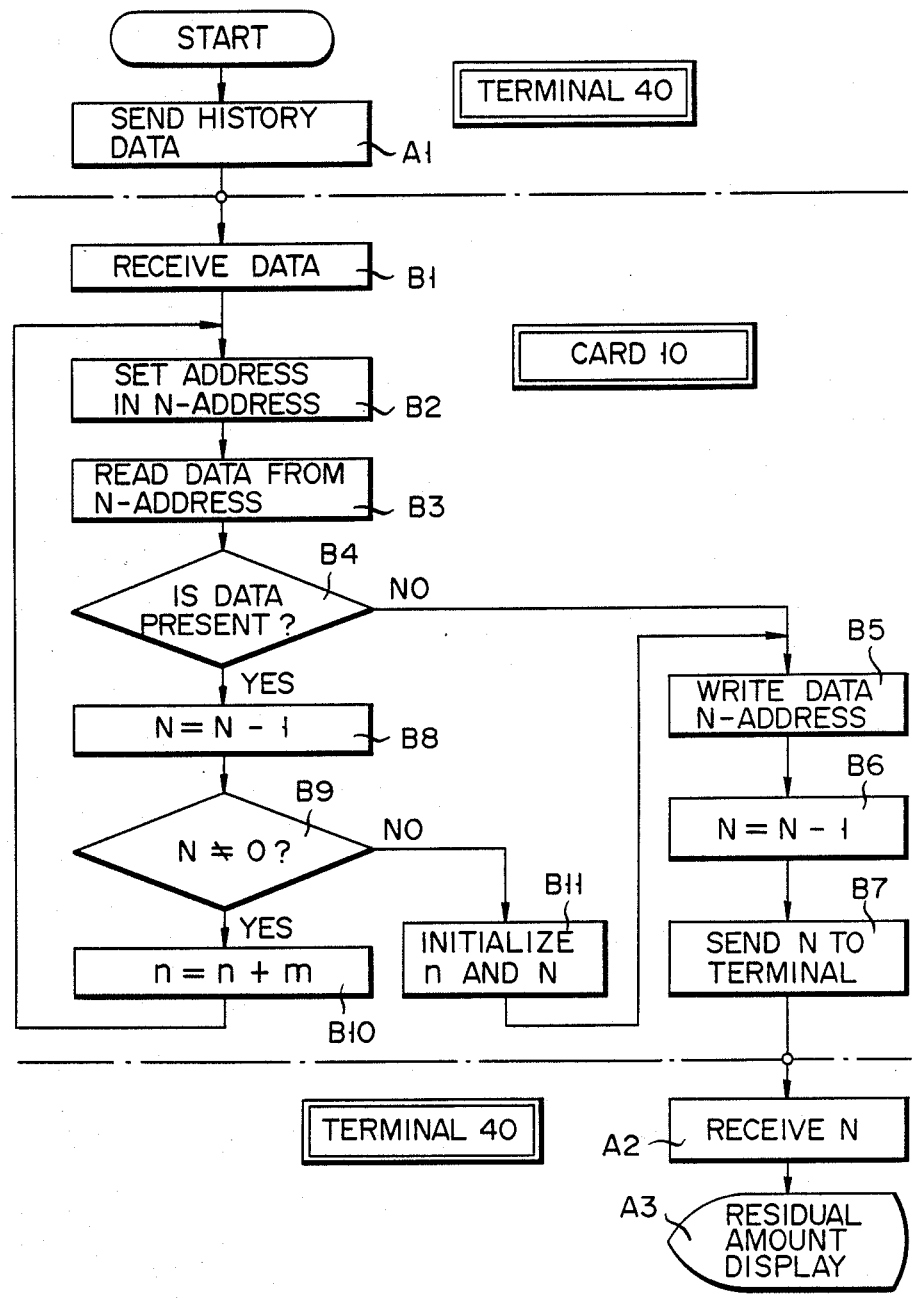
FIG. 3 is a flow chart for explaining the first embodiment.

As shown in FIG. 3, the history data is sent from terminal 40 to IC card 10 at step A1.

At step B1, the history data is received by IC card 10, in which case IC card 10 receives the history data through input controller 20 and input buffer 19. In this state, the process goes to step B2 to allow a head address, i.e. n address, of the history data storage area in data memory 26 to be designated by system controller 16.

Figure 4:
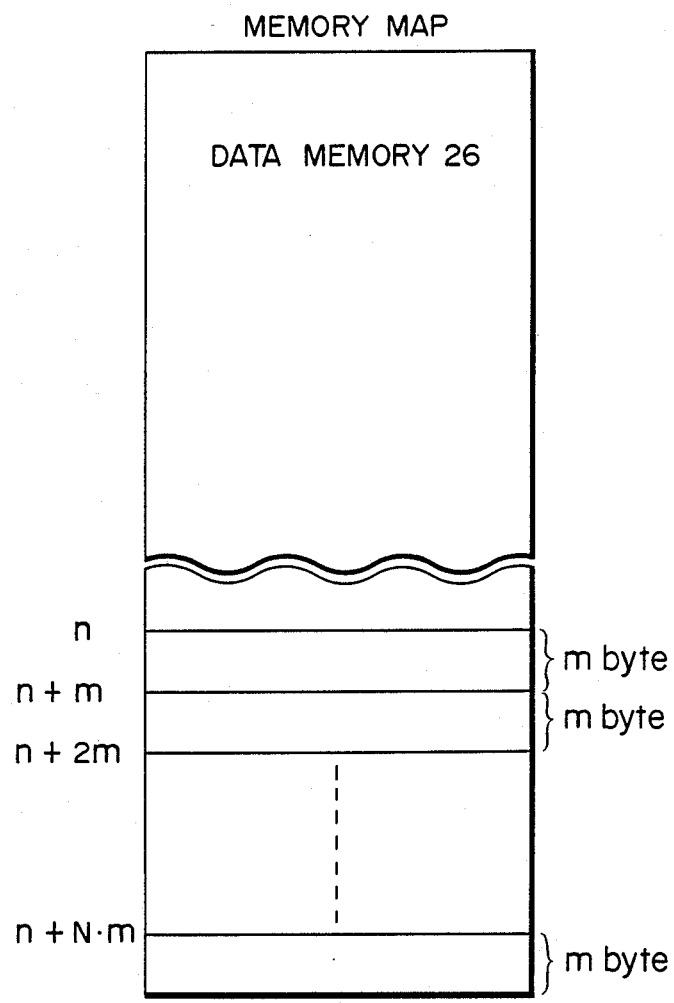
FIG. 4 is a memory map of a data memory in an IC card for use in the first embodiment of the invention.

Here, the history data storage area of data memory 26 is so set as shown in FIG. 4, noting that FIG. 4 shows a memory map of data memory 26. Each time the history data storage area receives history data from the head address n, a predetermined size of data, i.e., m-byte data, is written into the history data storage area in which case the number of times the history data can be written into the remaining portion of the history data storage area is set to "N".

When, at step B2, the n address is designated for the history data storage area, corresponding data is read out from the n address at step B3. At step B4, judgement unit 162 in system controller 16 judges whether or not any data exists at the n address. If the answer is in the negative, the process goes to step B5 and m-byte data is written as history data into the n address of data memory 26. Then the process goes to step B6 and operation circuit 161 in system controller 16 is operated such that the number of times, N, is counted down by one at register 163.

At step B7, terminal 40 receives the data, representing the remaining number of times, N, through output buffer 21 and output controller 22 and at step A2 input buffer 59 in terminal 40 receives it through input controller 60. At step A3, main controller 47 supplies a corresponding control instruction to display drive controller 48 and the remaining portion of the history data storage area is displayed on display section 73 in accordance with a remaining available number of times N.

At step B4, if the answer is in the affirmative, the process goes to step B8 and calculation unit 161 in system controller 16 is operated such that the remaining available number of times, N, is subtracted by one at register 163. At step B9, judgement unit 162 in system controller 16 judges whether or not the remaining available number of times, N, reaches zero, that is, the history data can still be written into the history data storage area. If N≠0, then the process goes to step B10 and calculation unit 161 in system controller 16 permits the head address n of register 163 to be added by an m-byte. As a result, the process goes back to step B2 and a new address is designated for an (n+m) address at the history data storage area. At step B2, the corresponding data is read out for execution.

In a similar way, the (n+2m), (n+3m), ..., addresses are sequentially designated up to an (n+Nm) address until judgement circuit 162 in system controller 16 judges that the answer is in the negative. Thereafter, the aforementioned step B5 et seq. are executed and, in this way, a remaining available portion of the history data storage area is displayed on display section 73 of terminal 40 in accordance with the remaining available number of times, N, at that time.

When N=0 at step B9, the process goes to step B11 and the ahead address n and remaining number of times, N, are set by system controller 16 to their maximum value. If, in this state, the process goes to step B6 subsequent to the execution of step B5, the remaining number of times, N, is returned to its initial value. As a result, display section 73 of terminal 40 displays a maximum remaining available history data storage area in accordance with a maximum remaining number of times, N, at the initial time.

Thereafter, the history data supplied from terminal 40 is sequentially written into the history data storage area, starting with the n address set to the initial value. At the same time, the remaining number of times, N, is subtracted by one, displaying the remaining portion of the history data storage area.

According to the IC card system of this invention, the remaining available portion of the history data storage area can be sequentially displayed on the display section, with the use of the IC card, in accordance with the history data stored in the data memory at the aforementioned history data storage area. Thus the card holder can conveniently use the IC card, while confirming a remaining available portion of the history data storage area at all times.

Furthermore, the card holder can also confirm the remaining available portion of the history data storage area at all times even when an EEP ROM is used as the data memory of the embodiment, thus eliminating the problem of "data erasure" which would often be encountered when the card holder, being unaware of this fact, wants to know the history data which would otherwise have been retained in the memory of the aforementioned history data storage area.

Although in the aforementioned first embodiment the EEP ROM has been explained as being used as the data ROM, use may be made of the EP ROM.

Figure 5:
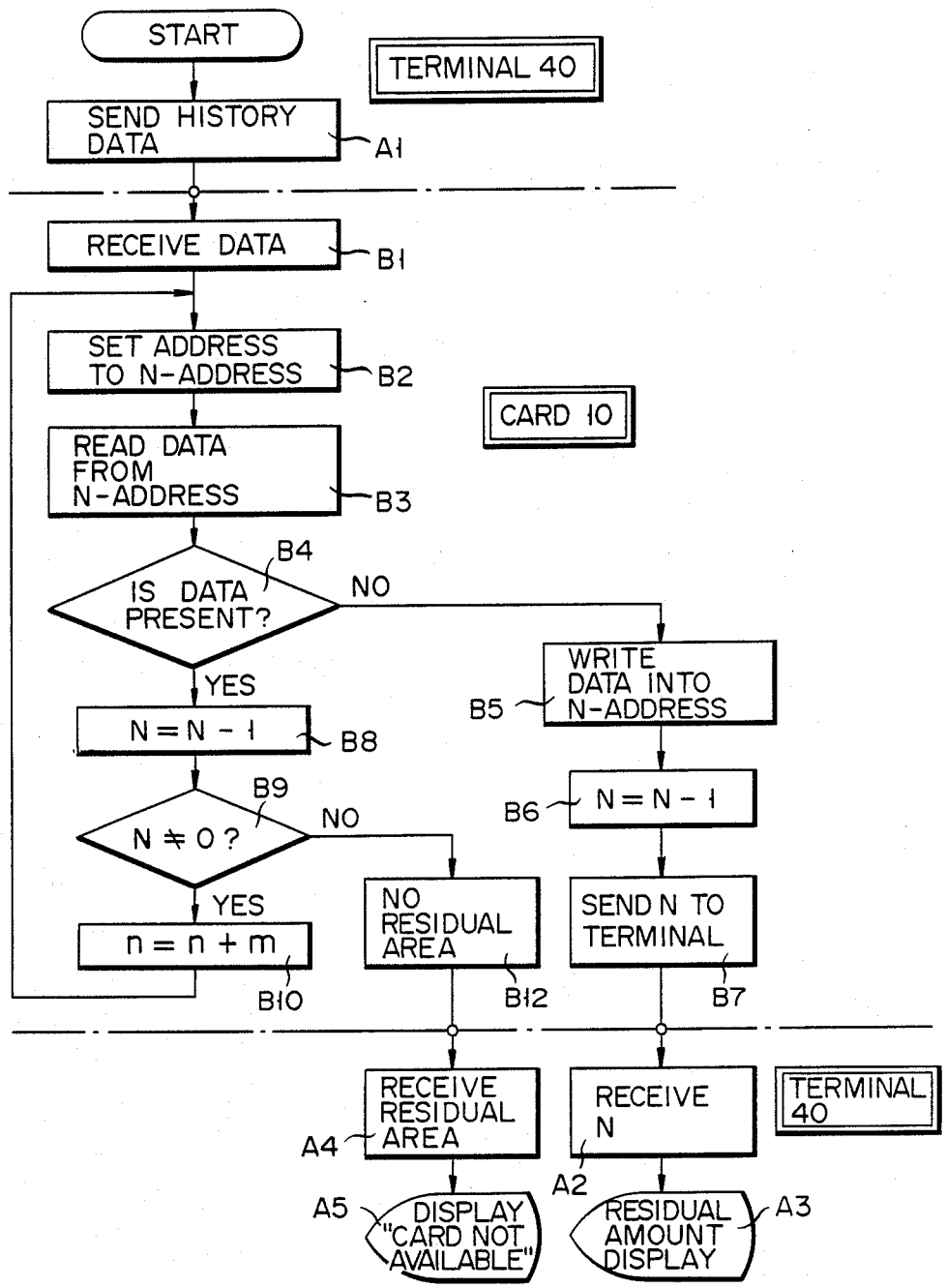
FIG. 5 is a flow chart for explaining an IC card system according to a second embodiment of this invention.

A second embodiment of this invention is operated as indicated by a flow chart in FIG. 5. The flow chart in FIG. 5 is substantially the same as in FIG. 3, except in the following respects. That is, at step B9, judgement unit 162 in system controller 16 judges whether or not a remaining available number of times, N, reaches zero, that is, history data cannot be written into the history data storage area in the memory. When the judgement circuit judges that N=0, then the process goes to step B12. At step B12, the data indicating that there is no remaining available history data storage area is sent terminal 40. At step A4, the terminal 40 receives the data through input controller 60 and input buffer 59. At step A5, main controller 47 issues a control instruction to display drive controller 48, displaying that the card cannot be used. In this case, in place of making a data display on display section 73 an alarm sound may be produced by supplying a control instruction to sound controller 42, or an alarm sound may be produced while, at the same time, making a data display on display section 73.

The other aspect of this embodiment is the same as in FIG. 3 and any further explanation is therefore omitted.

By so doing, the card holder can know the current status of the IC card immediately, before the history data storage area is used up. It is, therefore, possible for the card holder to avoid the inconvenient situations in which the IC card is found to be suddenly unusable, after the available history data storage area in the memory has been exhausted.

Figure 6A:
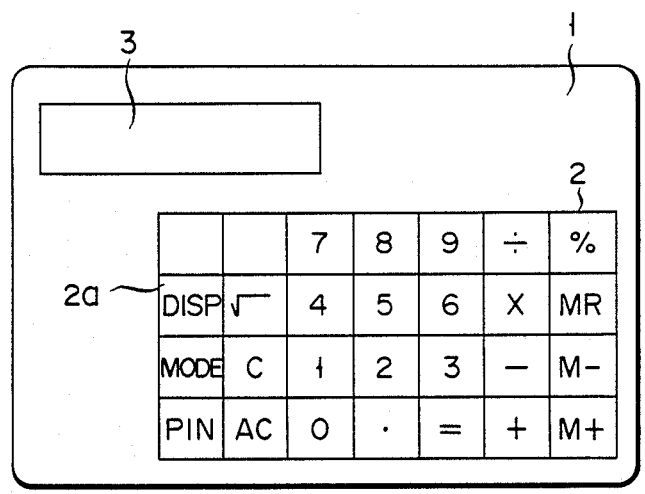
FIGS. 6A and 6B are an external view showing an IC card body for use in an IC card system according to a third embodiment of this invention.
Figure 6B:
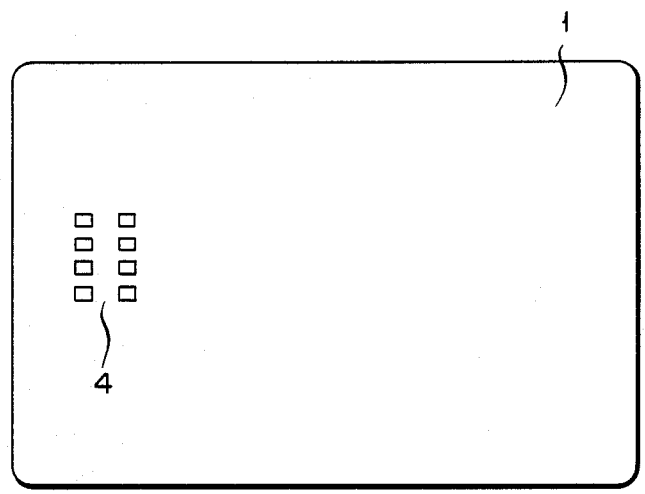

Although, in the first and second embodiments, terminal 40 has been explained as being used for making a remaining available history data display, a card body per se can be used, as in a third embodiment shown in FIGS. 6A and 6B, with a battery incorporated therein so that the remaining available history data area can be displayed on the display section of the card, itself.

In the third embodiment, keyboard 2 and LC display section 3 are formed on the surface of card body 1. Keyboard 2 has numeral keys, function keys for a calculator, mode key for designating modes for use in the calculator or the IC card, "PIN" key for personal identification number reference, and "DISP" key 2a for displaying a remaining available history data storage area.

Furthermore, card body 1 has an external connection terminal section 4 on the rear surface, which is comprised of 4×2 terminals for connection to IC card terminal 40.

An internal circuit of the card further includes, in addition to the circuits shown in FIG. 1, a battery and drive circuit for LC display.

When a remaining history data storage area is to be displayed, aforementioned "DISP" key 2a are operated whereby steps B1 to B11, A2 and A3 as shown in FIG. 3 are performed on card body 1.

In the flow chart shown in FIG. 5, steps B2 to B12 and A2 to A5 are similarly effected within card body 1. By so doing, a remaining available history data storage area or a card "unusuable" state is displayed on LC display section 3.

This invention is not restricted to the aforementioned embodiments. Various changes or modifications may be made without departing from the spirit and scope of this invention. For example, display of the memory areas may be a number of used or remaining available areas, and may be numerically or graphically.

According to this invention, a remaining available history data area can be sequentially and readily displayed on the display means, thus avoiding a feeling of uneasiness by the card holder during usage.

What is claimed is:

1. An IC card system comprising:
   memory means having a plurality of areas for storing history data of transactions performed with the use of an IC card;
   read/write means for writing said history data into one of said plurality of areas in said memory means and reading out data from any predetermined area, each time the transaction is performed;
   detecting means for detecting a number of used or remaining available areas of said plurality of areas in said memory means; and
   display means for displaying a value corresponding to the number of areas detected by said detecting means.

2. The IC card system according to claim 1, in which said detecting means includes:
   judging means for judging whether or not there exists any data in the area of said plurality of areas in said memory means; and
   counting means for counting the number of those areas stored with the data, on the basis of a result of judgement by said judging means.

3. The IC card system according to claim 1, in which said memory means is of an EEP ROM type having means for, when said detecting means detects that an available data storage area number reaches zero, writing data of a current transaction into the last data area in said memory means and for setting said available data storage area number to an initial value.

4. The IC card system according to claim 1, in which said memory means is of an EP ROM type having means for, when said detecting means detects that an available data storage area number reaches zero, displaying IC card unusable state on said display means.

5. The IC card system according to claim 1, said IC card system comprising an IC card and card terminal into which said IC card is loaded, in which said display means is provided on said card terminal and responsive to a result of detection by said detecting means in said IC card to display the number of areas.

6. The IC card system according to claim 1, in which said display means is provided on said IC card.

7. The IC card system according to claim 6, in which said IC card system further includes a keyboard having at least one predetermined key operated to allow the number of areas to be displayed on said display means.

* * * * *